United States Patent [19]

Wanstreet

[11] 4,015,623
[45] Apr. 5, 1977

[54] TIRE VALVE WITH PRESSURE RELEASE MEANS

[75] Inventor: Gregory E. Wanstreet, Canal Fulton, Ohio

[73] Assignee: The B.F. Goodrich Company, Akron, Ohio

[22] Filed: Aug. 27, 1975

[21] Appl. No.: 608,060

Related U.S. Application Data

[63] Continuation of Ser. No. 412,627, Nov. 5, 1973, abandoned.

[52] U.S. Cl. .............................. 137/224; 137/232; 137/513; 220/203
[51] Int. Cl.² ...................................... F16K 15/20
[58] Field of Search ........ 137/223, 224, 232, 512.3, 137/525.3, 543.21, 467, 557, 226; 220/89 A, 339, 203; 133/89, 89.1, 89.2, 89.3, 89.4; 116/34, 65, 125

[56] References Cited

UNITED STATES PATENTS

| | | | |
|---|---|---|---|
| 1,006,159 | 10/1911 | Wetherholt | 137/224 |
| 1,139,463 | 5/1915 | Taylor | 137/513 |
| 1,355,230 | 10/1920 | Kaiser | 137/224 |
| 1,460,775 | 7/1923 | Walsh | 137/232 X |
| 1,601,761 | 10/1926 | McKay | 137/224 |
| 2,697,915 | 12/1954 | Chisholm | 137/543.21 X |
| 3,308,847 | 3/1967 | Umann | 137/505.42 X |
| 3,426,787 | 2/1969 | Fuller | 137/226 |

*Primary Examiner*—Harold W. Weakley
*Attorney, Agent, or Firm*—Joseph Januszkiewicz; W. A. Shira, Jr.

[57] ABSTRACT

A valve assembly having a pair of flow passages in fluid communication with a chamber leading to a tire. One of the passages contains a typical one-way valve core mechanism while the other passage contains a pressure release mechanism. The cross sectional area of the tire inflation passage is less than the cross sectional area of the passage leading from the chamber to the pressure release bore. The exhaust port has a closure means which opens simultaneously with the pressure release mechanism. The closure means offers resistance to escaping inflation fluid which serves to urge the pressure release mechanism open against the biasing force of spring means urging it closed.

2 Claims, 4 Drawing Figures

TIRE VALVE WITH PRESSURE RELEASE MEANS

CROSS REFERENCE TO RELATED APPLICATION

This application is a continuation of U.S. patent application Ser. No. 412,627, filed Nov. 5, 1973 now abandoned.

BACKGROUND OF THE INVENTION

This invention relates to a tire valve for inflating a tire wheel assembly and for preventing over-inflation and subsequent bursting of the tire during inflation or in road use. Normally tires are inflated up to a safe operating pressure; however, the inflating equipment may have the capacity to overinflate the tire with an inflating medium at an excessively high pressure. This creates a hazard for personnel in the area of the tire during inflation if the tire should burst at that time. The valve of this invention is also useful to release excessive tire pressure which might be developed in service.

Prior to the present invention, safety relief valves have been devised in which pressure release devices were incorporated in the valve stem; however, their design has been expensive to manufacture and difficult to adjust and service. Accordingly, it has not been practical to provide valves of this design on the number of installations where this safety feature is desirable. With the safety valve designs proposed heretofore, the valve stems have had an increased length to accommodate the additional mechanism and this has made the valves more vulnerable to damage. There was also the problem of releasing the inflating medium from the tire at a rate exceeding the inflation rate to effectively prevent overinflation.

SUMMARY OF THE INVENTION

The tire valve of this invention provides an assembly in which the valve has a total length substantially the same as a standard valve stem but is of substantially greater strength. The valve body mounts a tire inflation valve mechanism and a pressure release mechanism in separate passages, both of which are in fluid communication with each other and with the tire through a chamber in the valve body. By mounting the inflation valve core in one passage and the pressure release mechanism in the other passage, quick and easy access may be had to these mechanisms for assembly and maintenance. The relative cross sectional areas of the inflation passage and pressure relief passage are selected so that it is impossible to apply more pressure to the tire than is required to actuate the pressure release mechanism, even if the source pressure is not removed when the pressure release mechanism is actuated.

The exhaust port is covered by a closure member which is operatively interconnected to the pressure release valve to open and close in response to the opening and closing of the pressure release valve.

The accompanying drawings show one preferred form of tire valve assembly built in accordance with and embodying the invention.

DETAILED DESCRIPTION

Figure 1:
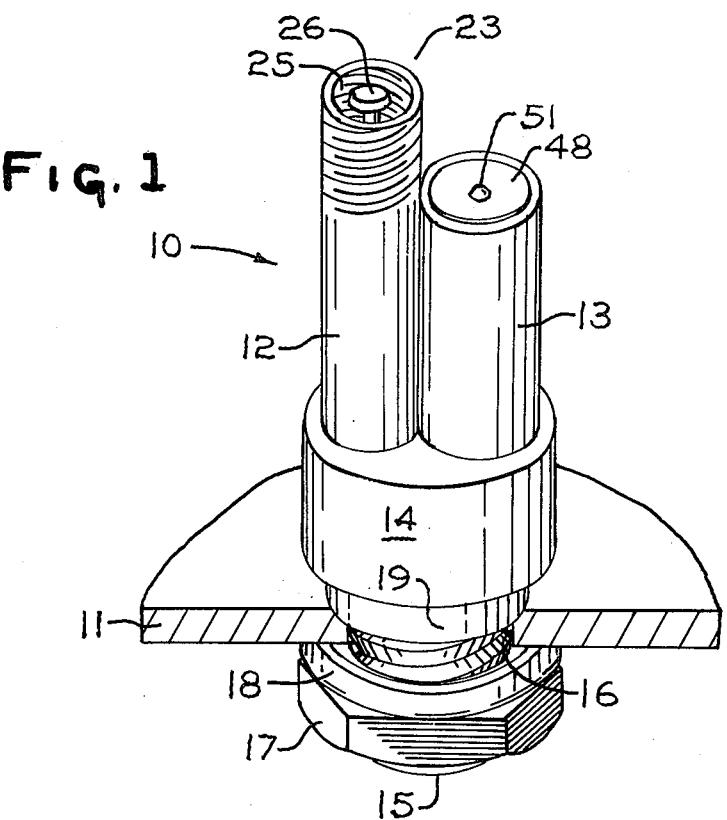
FIG. 1 is a perspective view of the tire valve assembly mounted on the wheel rim with parts being sectioned and broken away.

Referring to FIG. 1, tire valve assembly 10 is shown installed on a wheel rim 11 with a cylindrical inflation casing 12 and a cylindrical pressure release casing 13 extending outwardly from a valve body member 14. A threaded shank 15 extends through a rim hole 16 in the rim 11 and a nut 17 is threaded on the shank for clamping the valve body member 14 to the rim.

Figure 2:
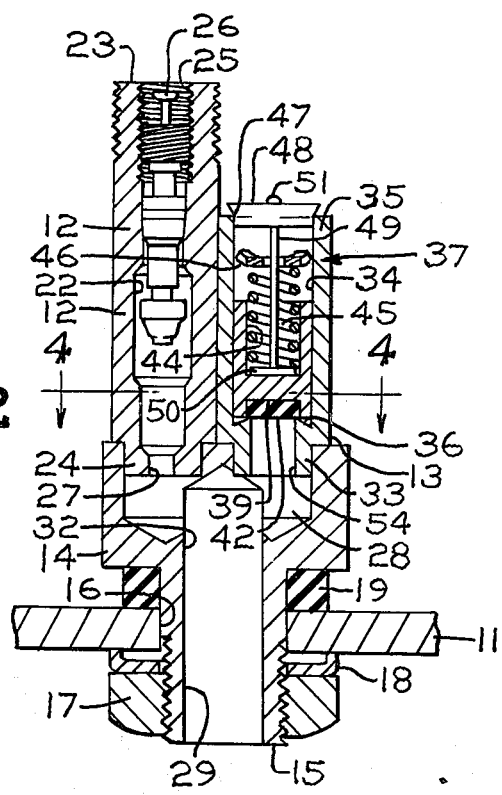
FIG. 2 is a longitudinal cross sectional view of the valve assembly of FIG. 1, showing the pressure release mechanism in the closed position.

As shown more clearly in FIG. 2, a spring washer 18 may be interposed between the nut 17 and rim 11 and a sealing washer 19 of rubberlike material may be interposed between the valve body member 14 and rim for clamping the valve body member to the rim in sealing engagement. The shank 15 could also be fastened to the rim 1 by other means such as a rubber snap-in type of connection.

The cylindrical inflation casing 12 has an inflating passage or inflation bore 22 extending from an outer end 23 to an inner end 24 of the casing which is inset in the valve body member 14. The outer end 23 of the inflation casing 12 is threaded and has an outer connecting port 25 for connection to a source of inflating medium under pressure such as an air hose connected to a compressor or a bottle of compressed air or other suitable gas. A valve core 26 of a type well known in the art may be threaded in the inflation bore 22 to communicate the inflating medium from the outer end 23 to the inner end 24 of the inflation casing 12 and prevent flow of the inflating medium in the other direction.

An inflation port 27 at the inner end 24 of the inflation casing 12 provides an opening through which the inflating medium is conducted to a chamber 28 in the valve body member 14. The shank 15 contains a tire connecting passage 29 for communicating tire inflating medium from the chamber 28 through a tire passage port 32 to the tire cavity within the rim 11 and the tire mounted on the rim (not shown).

The cylindrical pressure release casing 13 extends alongside the inflation casing 12 and has an inner end 33 inset in the valve body member 14. The pressure release casing 13 includes a relief passage such as pressure release bore 34 extending from an outer end 35 to a valve seat 36 close to the inner end 33 of the casing 13.

The pressure relief passage is comprised of pressure relief port 54 leading from chamber 28 to a pressure release bore 34 with a pressure release valve mechanism 37 disposed between port 54 and bore 34. The bore 34 empties to the atmosphere through exhaust port 47.

Figure 4:
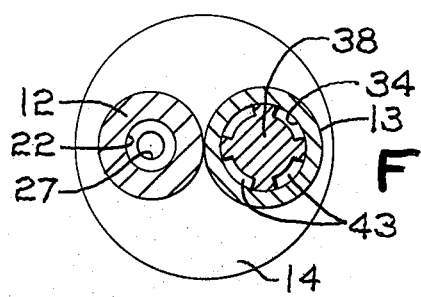
FIG. 4 is a sectional view taken along the plane of line 4—4 of FIG. 2.

A pressure release valve mechanism 37 adapted for reciprocating sliding movement in the pressure release bore 34 has a piston 38 with a face 39 disposed towards the chamber 28 of the valve body member 14. A seal 42 of rubberlike material is mounted on the face 39 for sealing engagement with the valve seat 36. As shown more clearly in FIG. 4, the outer cylindrical surface of the piston 38 has longitudinal grooves 43 for bypassing the inflating medium through the pressure release bore 34, when the pressure release valve mechanism 37 is in the open position.

Figure 3:
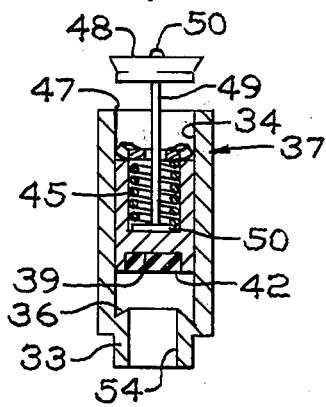
FIG. 3 is a sectional view of a portion of the tire valve assembly shown in FIGS. 1 and 2 showing the pressure release mechanism and exhaust port cover in the open position.

On the opposite side of the piston 38 from the seal 42, a cavity 44 is provided in the piston for receiving a coil spring 45 extending toward the outer end 35 of the pressure release casing 13. A star washer 46, shown in FIGS. 2, 3 and 5, which may be inserted through outer end 35 of the casing 13, engages the coil spring 45 at a predetermined position providing the desired force to bias the seal 42 of piston 38 against the valve seat 36. The star washer 46 is shaped to grip the walls of the relief bore 34 and retain the coil spring 45 in a compressed condition.

An exhaust port 47 is provided at the outer end 35 of the pressure release casing 13 for dissipating the inflating medium from the pressure release bore 34 to the atmosphere. An exhaust port cover or closure means 48 is mounted for movement when piston 38 is moved from a closed position wherein seal 42 of piston 38 engages valve seat 36 to an open position when excess pressure is being exhausted. Cover 48 is mounted upon an operating rod or support pin 49 which extends outwardly from a base member 50 which is mounted within cavity 44 of the piston. The base is placed in the cavity before installation of the spring 45 whereby the spring serves as a retaining means for the base member. After the spring and star washer 46 is installed, the cover is installed over the rod 49.

The cover 48 is retained upon the operating rod by any suitable retaining means 51. In practice the operating rod may merely be struck just above the cover 48 to provide an enlargement which will not pass through the opening in the cover. Alternatively, a separate retaining means may be employed to secure the cover 48 to the rod 49. It is preferred to place the retaining means close to or in contact with the outer face of the cover 48 so that the cover will provide an effective barrier to foreign matter which might otherwise enter the exhaust port. In practice there is a yieldable friction fit between the wall of operating rod and the bore through the cover, which may be made of plastic material if desired. Preferably a semi-rigid resilient material is employed. If the fit between operating rod and the bore in the cover provides a clearance, the device will operate satisfactorily but small amounts of foreign matter may gain access through such clearance.

Various configurations of engaging surfaces of the cover and exhaust port may be employed so long as an effective barrier is provided against entrance of foreign matter. Also there should not be interference between the cover and the exhaust port which would offer resistance to movement of the cover. Such resistance would increase the blow-off pressure for which the valve and spring were designed.

At the inner end 33 of the pressure release casing 13, a relief port 54 for communicating inflating fluid between the pressure release bore 34 and chamber 28 is provided. As shown in FIG. 2, the inflation port or passage 27 has a cross sectional area less than the cross sectional area of the relief port 54 which is important to insure that the tire overinflation is released at a rate exceeding the inflation rate.

The pressure release piston area at the face 39 of piston 38, in the closed position, is less than the effective piston area at the face in the open condition of the valve mechanism. In this regard it will be noted that the diameter of the bore 34 is greater than the diameter of the relief port 54 and the diameter of valve seat 36. The diameter, or area, of the relief port 54 determines the effective area of face 39 upon which inflation pressure bears when the relief valve is in the closed position. It will be noted that seal 42 overlies the valve seat 36. However, when face 39 is moved away from the valve seat 36, the entire area of the end face of the fluted piston 38 becomes effective. The total net area of the end of face 39 of piston 38 is greater than the cross sectional area of relief port 54. Accordingly, the total force exerted upon the piston 38 in the open position is greater than that in the closed position, for a given unit pressure in chamber 28 and relief port 54. It necessarily follows that the pressure relief valve will remain open with a lower unit pressure than is required to open it initially. The exhaust port closure assembly further contributes to this pressure differential.

The inflation port 27 and the relief port 54 are on one side of the chamber 28 while the tire passage port 32 is on the other side of the chamber providing a substantially direct flow of inflating medium into the tire cavity during inflation through the inflation port and a substantially direct flow of the inflating medium from the tire cavity through the pressure release bore 34 in the event of overinflation. This construction also minimizes the possibility of actuating the pressure release valve mechanism 37 due to surges in the flow of inflating medium into the tire cavity.

The tire valve assembly 10 may be manufactured by fabricating the casings 12 and 13 and the valve body member 14 separately and then assembling them, as shown in FIG. 2. The complete assembly 10 can then be brazed together into a unitary structure. The assembly 10 may also be made of one piece as by casting or forging. In any case, the parallel side-by-side casings 12 and 13 provide a reinforced structure capable of withstanding hard usage on the road. Furthermore, ready access through the outer connecting port 25 to the inflation bore 22 and through the exhaust port 47 to the pressure release bore 34 may be had to service and adjust the valve core 26 and pressure release valve mechanism 37.

In installation of the tire valve assembly 10, the shank 15 is inserted through the rim hole 16 and the nut 17 screwed on the threaded portion of the shank.

The force of the fluid pressure working upon the effective relief piston area at face 39 overcomes the biasing force of the spring 45 to move the piston away from the valve seat 36 to thereby vent the inflating medium through the grooves 43. The dust cap 48 is then lifted out of the exhaust port 47 and the inflating medium exhausted into the atmosphere. Due to the difference in effective piston areas of the pressure relief seal 42 between the open position and the closed position, more pressure is required to initially actuate the pressure release mechanism 37 than is required to maintain it in the exhaust position. This difference of opening and closing pressures is further increased because the escaping fluid impinging against the underside of cover 48 provides an additional force tending to compress the spring 48, once the valve is opened. Once the pressure release valve mechanism is actuated, the escaping fluid impinges against the inwardly forcing surface of cover 48, and because stop means 50 is operatively connected to the end of spring 45 through operating rod 49, the escaping air serves to further compress the spring. Accordingly, the pressure release valve mechanism 37 remains in the open position until such time as the pressure in the tire drops to a predetermined level below valve actuation or exhaust pressure. The actual relationship between the pressure required to open and the lesser pressure permitting the exhaust valve to close is determined, for the most part by two factors, namely the difference in effective piston areas between the open and closed positions of the valve and the force exerted upon cover 48 by impingement of escaping fluid tending to further urge the piston open.

Upon actuation of the pressure release valve mechanism 37, the inflating medium continues to pass through the pressure release bore 34 until the spring 45 forces the piston 38 into the closed position. In a preferred embodiment, the piston 38 will return to the closed position when the inflating medium is reduced to approximately eighty percent of the predetermined pressure required to open it. Accordingly, in most cases the pressure relief valve will remain open, in the exhaust position, until the source of inflating pressure is removed from the outer end of inflation casing 12. In a specific example of a valve constructed and operated according to the teachings of this invention, a source pressure of 150 p.s.i.g., for example, causes the pressure release mechanism to actuate or open at about 40 p.s.i.g. and reseal at about 38 p.s.i.g. when the inflation source is removed. The same valve will "fully vent", i.e. remain continuously open, at 45 p.s.i.g. so that the inflation pressure in the associated tire could not ever exceed 45 p.s.i.g. Without the influence of exhaust port cover 48, the identical valve requires about 55 p.s.i.g. to fully vent. Stated differently, without the exhaust port closure of this invention interconnected to the pressure release valve, 55 p.s.i.g. is required to maintain the valve continuously open.

The star washer 46 which grips the wall of the pressure release bore 34 is positioned at a predetermined location to yield the desired spring force necessary to obtain the proper release and resealing force of the valve mechanism 37. The cover 48 protects the pressure release valve mechanism 37 from dirt and foreign matter while in use but does not hamper the actuation of the valve mechanism.

It is a common practice to inflate tires without employing a valve core in order to reduce inflation time. For this reason the valve of this invention provides the inflation bore 27 with a size such that the rate of flow is restricted to essentially that which would be allowed if a valve stem were properly installed. This restricted passage 27 is also especially desirable for the inflation of foldable tires which are molded in the flat folded condition and therefore create a greater back pressure due to the resiliency of the tire. Foldable spare tires are also inflated by portable pressure bottles, and it is especially desirable to have a pressure release valve mechanism which will retain the inflating medium after the pressure is reduced because of the limited supply of inflating medium in the pressure bottle. The tire valve assembly 10 of this invention may be used on all types of tires and also on other pressure vessels where the problem of overinflation exists.

I claim:

1. An inflating and pressure relieving tire valve assembly for use on a tire rim of a tire wheel assembly comprising an elongated valve body having a first portion attachment means; said valve body having a pair of adjoining contiguous outwardly extending parallel open ended cylindrical portions, one being long and one short relative to each other; a chamber within said body closely adjacent to the said first portion; a tire connecting passage for communicating an inflating medium from said chamber; an inflating passage in the long one of said cylindrical portions joining said open end with said chamber and having a valve core therein for communicating an inflating medium from a source of fluid pressure to said chamber; a pressure relief passage in the short one of said adjoining cylindrical portions joining said open end with said chamber; said pressure relief passage having a pressure exhaust port at one open end and a pressure release port at the other end providing fluid communication between said chamber and said exhaust port at one end of said relief passage to release excess inflating medium through said exhaust port to the atmosphere; the cross-sectional area of said inflating passage being less than the cross-sectional area of said relief port; a pressure release valve mechanism in said pressure relief passage operative to control flow of fluid therethrough; pressure responsive means operative to close said valve mechanism at fluid pressures in said chamber less than a predetermined pressure and open said valve mechanism when fluid pressures in said chamber exceed said predetermined pressure; said pressure release valve mechanism comprising a piston closely reciprocably received within said pressure relief passage; said piston having recesses along the outer periphery for directing the flow of fluid thereby from said chamber to said exhaust port; said piston being an elongated cylindrically shaped member with a cup-shaped centrally disposed bore; said elongated piston mounted for linear movement in said pressure relief passage; valve seat means at the end of said pressure relief port having a diameter that is less than the effective diameter of said piston; sealing means on one end of said piston to sealingly engage said valve seat; a press fit star washer in said pressure relief passage; spring means seated in said bore of said piston and extending outwardly therefrom engaging said star washer for biasing said piston toward said valve seat to close said pressure relief passage from communicating with said chamber; and an exhaust port dust cover and indicator means operatively interconnected by rod means with said valve mechanism to close said exhaust port when said valve mechanism is closed and open said exhaust port when said valve mechanism is open.

2. The tire valve assembly of claim 1 wherein said rod means comprises an operating rod secured to and extending outwardly from said piston through said exhaust port; and said cover is mounted on said operating rod for movement therewith to cover said exhaust port to keep dust out.

* * * * *